United States Patent
Gao et al.

(10) Patent No.: US 12,294,801 B2
(45) Date of Patent: May 6, 2025

(54) CAPMID DESIGN IN VRFD FOR HDR STRUCTURE

(71) Applicant: OMNIVISION TECHNOLOGIES, INC., Santa Clara, CA (US)

(72) Inventors: Zhe Gao, San Jose, CA (US); Ling Fu, Union City, CA (US); Qing Qin, Sunnyvale, CA (US); Zhiyong Zhan, Fremont, CA (US); Tiejun Dai, Santa Clara, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 121 days.

(21) Appl. No.: 18/303,479

(22) Filed: Apr. 19, 2023

(65) Prior Publication Data
US 2024/0357253 A1   Oct. 24, 2024

(51) Int. Cl.
  *H04N 25/77* (2023.01)
  *H04N 25/78* (2023.01)
(52) U.S. Cl.
  CPC .............. *H04N 25/77* (2023.01); *H04N 25/78* (2023.01)
(58) Field of Classification Search
  None
  See application file for complete search history.

(56) References Cited

U.S. PATENT DOCUMENTS

| | | | |
|---|---|---|---|
| 11,343,450 B1 | 5/2022 | Hasegawa | |
| 2017/0347047 A1* | 11/2017 | Mao | H04N 25/622 |
| 2022/0013551 A1* | 1/2022 | Mun | H10F 39/18 |
| 2022/0264042 A1* | 8/2022 | Innocent | H04N 25/616 |
| 2023/0179891 A1* | 6/2023 | Bogaerts | H04N 25/583 |
| | | | 348/230.1 |
| 2024/0089631 A1* | 3/2024 | Takayanagi | H04N 25/78 |
| 2024/0098386 A1* | 3/2024 | Koifman | H04N 25/78 |
| 2024/0214707 A1* | 6/2024 | Mori | H04N 25/585 |
| 2024/0244344 A1* | 7/2024 | Du | H04N 25/771 |
| 2024/0244350 A1* | 7/2024 | Phan | H04N 25/59 |
| 2024/0259705 A1* | 8/2024 | Velichko | H04N 25/59 |

* cited by examiner

*Primary Examiner* — Cynthia Segura
(74) *Attorney, Agent, or Firm* — Perkins Coie LLP; Daniel L. Jackstadt (57) ABSTRACT

A pixel circuit includes a photodiode configured to photo generate image charge in response to incident light, a floating diffusion coupled to receive the image charge from the photodiode, a transfer transistor coupled between the photodiode and the floating diffusion to transfer the image charge from the photodiode to the floating diffusion, a reset transistor coupled between a variable voltage source and the floating diffusion, wherein the reset transistor is configured to be switched in response to a reset control signal, and a lateral overflow integration capacitor (LOFIC) coupled between the variable voltage source and the floating diffusion. The variable voltage source is configured to output a high-voltage level during a high conversion gain (HCG) reset signal readout and an HCG image signal readout, and a mid-voltage level during a LOFIC image signal readout and a LOFIC reset signal readout.

17 Claims, 4 Drawing Sheets

CAPMID DESIGN IN VRFD FOR HDR STRUCTURE

TECHNICAL FIELD

This disclosure relates generally to image sensors, and in particular but not exclusively, relates to high dynamic range (HDR) complementary metal oxide semiconductor (CMOS) image sensors.

BACKGROUND

Image sensors have become ubiquitous and are now widely used in digital cameras, cellular phones, security cameras, as well as in medical, automotive, and other applications. As image sensors are integrated into a broader range of electronic devices, it is desirable to enhance their functionality, performance metrics, and the like in as many ways as possible (e.g., resolution, power consumption, dynamic range) through both device architecture design as well as image acquisition processing. The technology used to manufacture image sensors has continued to advance at a great pace. For example, the demands of higher resolution and lower power consumption have encouraged the further miniaturization and integration of these devices.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photo generated by the pixels may be measured as analog output image signals on column bitlines that vary as a function of the incident image light. In other words, the amount of image charge generated is proportional to the intensity of the image light, which is read out as analog image signals from the column bitlines and converted to digital values to produce digital images (e.g., image data) representing the external scene. The analog image signals on the bitlines are coupled to readout circuits, which include input stages having analog-to-digital conversion (ADC) circuits to convert those analog image signals from the pixel array into the digital image signals.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or necessary in a commercially feasible embodiment are often not depicted in order to facilitate a less obstructed view of these various embodiments of the present disclosure.

DETAILED DESCRIPTION

Examples directed to an imaging system with a pixel circuit and a sample and hold circuit providing improved balancing of high conversion gain (HCG) and lateral overflow integration capacitor (LOFIC) reset signal (i.e., black) levels, improved voltage buffer design, reduced fixed pattern noise (FPN), improved linearity, and improved high dynamic range (HDR) structure are disclosed. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present disclosure. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system with a pixel circuit and a sample and hold (SH) circuit providing improved balancing of high conversion gain (HCG) and lateral overflow integration capacitor (LOFIC) reset signal (i.e., black) levels, improved voltage buffer design, reduced fixed pattern noise (FPN), improved linearity, and improved high dynamic range (HDR) structure are disclosed. In conventional imaging systems, a voltage source provides either a high-voltage level or a low-voltage level to a pixel circuit. For example, the same high voltage level can be applied to the pixel circuit during the HCG and LOFIC signal readouts in a global transfer period. This can lead to the LOFIC reset signal level being imbalanced with (e.g., higher than) the HCG reset signal level. As a result, a voltage buffer in an SH circuit may need to be toggled at different values during the HCG and LOFIC signal readouts in a rolling transfer period, adding complexity to the circuit and its operation. Moreover, the voltage buffer may need to be toggled at further different values when reading out different rows.

It is appreciated that circuit designs in accordance with the teachings of the present disclosure reduce the overall complexity, reduce FPN, and improve linearity by configuring a voltage source to provide a high-voltage level during HCG signal readouts and a mid-voltage level during LOFIC signal readouts in a global transfer period.

Thus, as will be shown and described in the various examples below, an example pixel circuit includes a photodiode configured to photo generate image charge in response to incident light, a floating diffusion coupled to receive the image charge from the photodiode, a transfer transistor coupled between the photodiode and the floating diffusion to transfer the image charge from the photodiode to the floating diffusion, a reset transistor coupled between a variable voltage source and the floating diffusion, wherein the reset transistor is configured to be switched in response to a reset control signal, and a lateral overflow integration capacitor (LOFIC) coupled between the variable voltage source and the floating diffusion. The variable voltage source is configured to output a high-voltage level during a high conversion gain (HCG) reset signal readout and an HCG image signal readout, and a mid-voltage level during a LOFIC image signal readout and a LOFIC reset signal readout.

Figure 1:
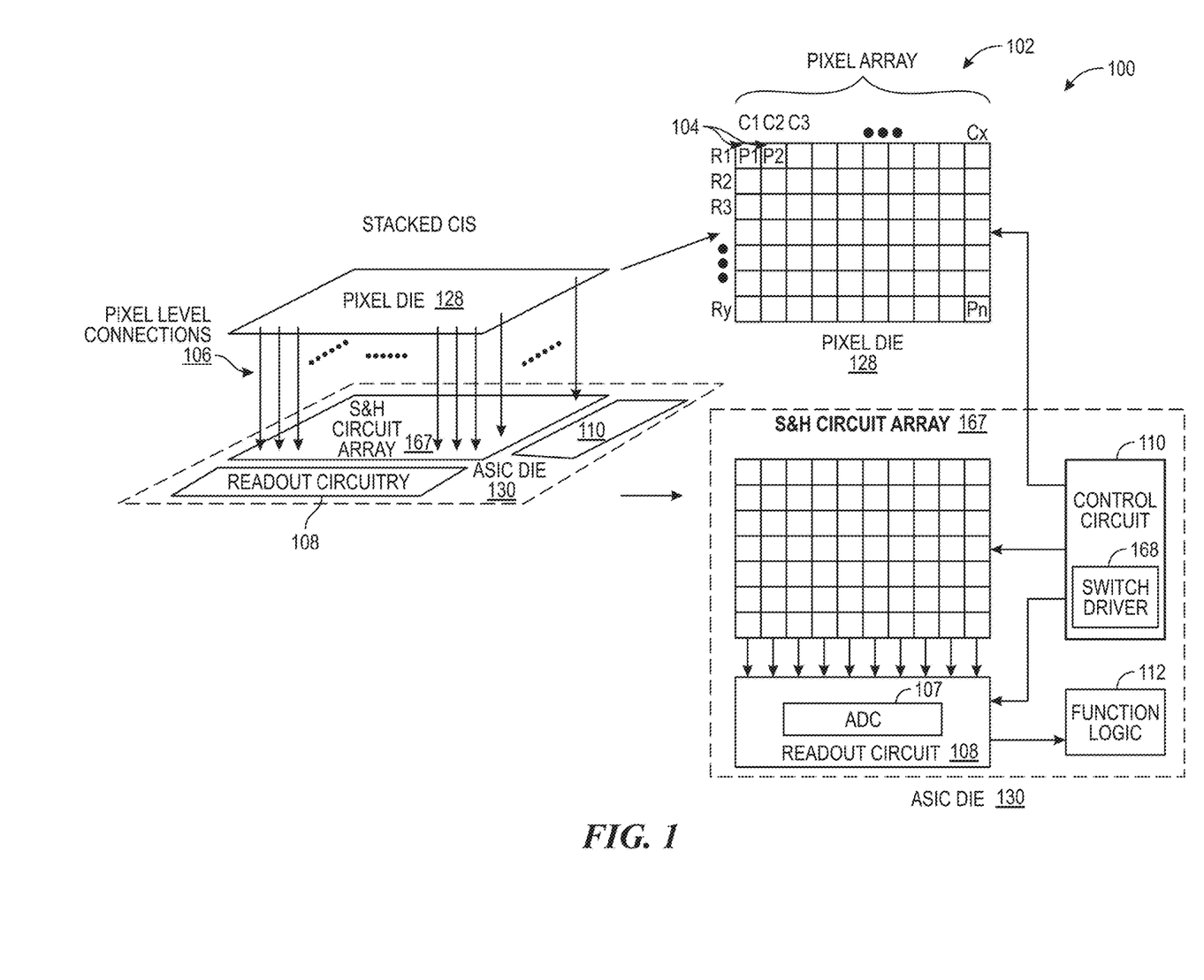
FIG. 1 illustrates one example of an imaging system in accordance with the teachings of the present disclosure.

To illustrate, FIG. 1 illustrates one example of an imaging system 100 in accordance with the teachings of the present disclosure. In particular, the example depicted in FIG. 1 illustrates an imaging system 100 implemented as a CMOS image sensor (CIS) in a stacked chipped scheme that includes a pixel die 128 stacked with a logic die or application specific integrated circuit (ASIC) die 130. In the example, the pixel die 128 includes a pixel array 102, and the ASIC die 130 includes a sample and hold circuit array 167 that are coupled to the pixel array 102 through pixel level connections 106. ASIC die 130 also includes a control circuit 110, a readout circuit 108, and function logic 112. In one example, pixel array 102 is a two-dimensional (2D) array of photodiodes, or image sensor pixel circuits 104 (e.g., pixels P1, P2 Pn). As illustrated, photodiodes are arranged into rows (e.g., rows R1 to Ry) and columns (e.g., column C1 to Cx) to acquire image data of a person, place, object, etc., which can then be used to render a 2D image of the person, place, object, etc. However, photodiodes do not have to be arranged into rows and columns and may take other configurations.

In one example, readout circuit 108 may be coupled to read out image data from the plurality of photodiodes in pixel array 102 through the sample and hold circuit array 167. As will be described in greater detail below, in one example, the sample and hold circuit array 167 includes a plurality of sample and hold circuits that are coupled to the pixel circuits 104 at the pixel level to sample and hold reset values as well as signal values from pixel array 102 through pixel level connections 106. The image data that is readout by readout circuit 108 may then be transferred to function logic 112. In various examples, readout circuit 108 may also include amplification circuitry, analog to digital conversion (ADC) circuitry 107 coupled to bitlines, or otherwise.

In one example, function logic 112 may simply store the image data or even manipulate the image data by applying post image effects (e.g., crop, rotate, remove red eye, adjust brightness, adjust contrast, or otherwise). In one example, readout circuit 108 may readout a row of image data at a time along readout column lines (illustrated) (i.e., bitlines between the sample and hold circuit array 167 and the readout circuit 108) or may readout the image data using a variety of other techniques (not illustrated), such as a serial readout or a full parallel readout of all pixel circuits 104 simultaneously.

In one example, control circuit 110 is coupled to pixel array 102 to control operation of the plurality of photodiodes in pixel array 102. As will also be described in greater detail below, control circuit 110 also includes a switch driver 168 that is coupled to generate the control signals to control the sample and hold circuit array 167 to sample and hold the reset voltage values and signal voltage values in the voltage domain (VD) from pixel array 102. In the depicted example, the control circuit 110 is also coupled to generate a global shutter signal for controlling image acquisition of all pixel values from the pixel array at substantially the same time, which may also be referred to as a voltage domain global shutter (VDGS). In one example, the shutter signal is a global shutter signal for simultaneously enabling all pixel circuits 104 within pixel array 102 to simultaneously capture their respective image data during a single acquisition window. In one example, image acquisition is synchronized with lighting effects such as a flash.

In one example, imaging system 100 may be included in a digital camera, cell phone, laptop computer, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
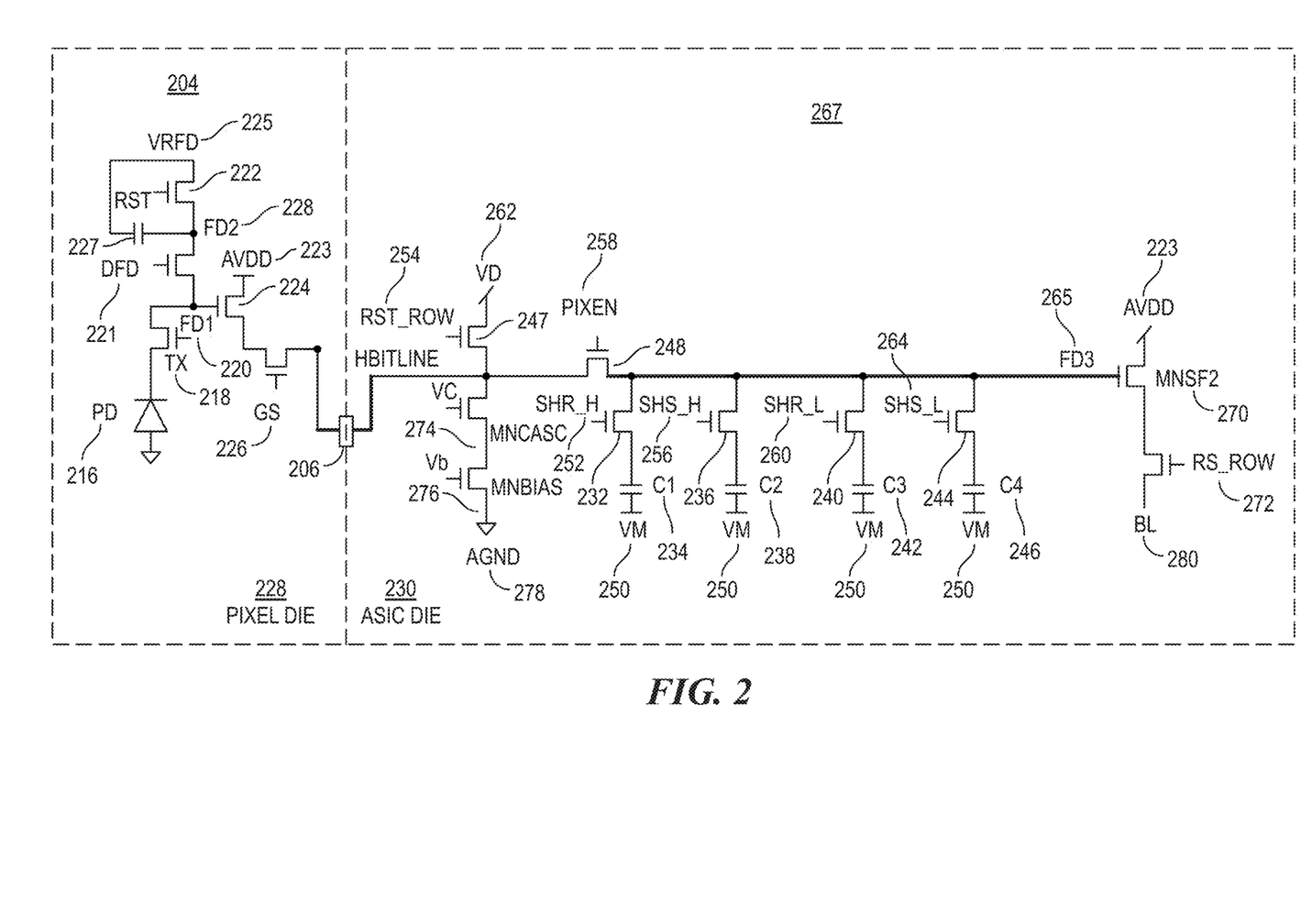
FIG. 2 illustrates a schematic of an example pixel circuit and an example sample and hold circuit in accordance with the teachings of the present disclosure.

FIG. 2 illustrates a schematic of an example pixel circuit 204 and an example sample and hold (SH) circuit 267 in accordance with the teachings of the present disclosure. It is appreciated that the pixel circuit 204 and the SH circuit 267 of FIG. 2 may be an example of one of the pixel circuits 104 and one of the SH circuits of the sample and hold circuit array 167, respectively, included in the imaging system 100 as shown in FIG. 1, and that similarly named and numbered elements described above are coupled and function similarly below.

In the illustrated example, the pixel circuit 204 includes a photodiode 216 configured to photo generate image charge in response to incident light. A first floating diffusion 220 is coupled to receive the image charge from the photodiode 216. A transfer transistor 218 is coupled between the photodiode 216 and the first floating diffusion 220 to transfer the image charge from the photodiode 216 to the first floating diffusion 220. A reset transistor 222 is coupled between a variable voltage source VRFD 225 and the first floating diffusion 220. The reset transistor 222 is configured to be switched in response to a reset control signal. A dual floating diffusion transistor 221 is coupled between the first floating diffusion 220 and the reset transistor 222. A second floating diffusion 228 is coupled to receive image charge from the first floating diffusion 220. A lateral overflow integration capacitor (LOFIC) 227 is coupled between the variable voltage source VRFD 225 and the first floating diffusion 220 and/or the second floating diffusion 228. A source follower transistor 224 has a gate terminal coupled to the first floating diffusion 220 and a drain terminal coupled to receive a high-voltage level AVDD 223. The source follower transistor 224 is configured to convert the image charge in the first floating diffusion 220 to an image signal, which is configured to be output through a sampling transistor 226 coupled between the source follower transistor 224 and the SH circuit 267.

The SH circuit 267 can be coupled to the pixel circuit 204 via a pixel level connection 206, such as a hybrid bond. In an imaging system that utilizes correlated double sampling (CDS), the charge at the first floating diffusion 220 is read out through the pixel level connection 206 after a floating diffusion reset operation in response to signals controlling the reset transistor 222 and the dual floating diffusion transistor 221 simultaneously, to obtain a reset signal. The image charge is then read out through the pixel level connection 206 after the image charge is transferred to the first floating diffusion 220 to obtain an image signal.

The SH circuit 267 includes a row reset transistor 247 coupled between a voltage buffer VD 262 and the pixel level connection 206, a cascode transistor 274 coupled between the row reset transistor 247 and ground 278, and a bias transistor 276 coupled between the cascode transistor 274 and ground 278. The row reset transistor 247 is configured to be controlled by a row reset control signal RST_ROW 254. In the depicted example, the bias transistor 276 is biased with a bias voltage Vb and serves as an SH current source, which provides current to the source follower transistor 224 through the pixel level connection 206 with a typical value of around 20 nA. A SH enable transistor 248 is configured to transfer the signal from the pixel level connection 206 to a third floating diffusion 265 in response to a SH enable control signal PIXEN 258. The third floating diffusion 265 is coupled to the gate terminal of a second source follower transistor 270. The second source follower transistor 270 is coupled between the high-voltage level AVDD 223 and a row select transistor 272, which is configured to send signals to bitline 280.

The SH circuit 267 further includes an HCG reset capacitor 234 coupled between the row reset transistor 247 and an SH voltage source VM 250, an HCG reset transistor 232 coupled between the row reset transistor 247 and the HCG reset capacitor 234, an HCG image capacitor 238 coupled between the row reset transistor 247 and the SH voltage source VM 250, an HCG image transistor 236 coupled between the row reset transistor 247 and the HCG image capacitor 238, an LOFIC reset capacitor 242 coupled between the row reset transistor 247 and the SH voltage source VM 250, an LOFIC reset transistor 240 coupled between the row reset transistor 247 and the LOFIC reset capacitor 242, an LOFIC image capacitor 246 coupled between the row reset transistor 247 and the SH voltage source VM 250, and an LOFIC image transistor 244 coupled between the row reset transistor 247 and the LOFIC image capacitor 246.

The HCG reset transistor 232 is configured to sample and hold an HCG reset signal into the HCG reset capacitor 234 in response to an HCG reset storage signal SHR_H 252. The HCG image transistor 236 is configured to sample and hold an HCG image signal into the HCG image capacitor 238 in response to an HCG image storage signal SHS_H 256. The LOFIC reset transistor 240 is configured to sample and hold an LOFIC reset signal into the LOFIC reset capacitor 242 in response to an LOFIC reset storage signal SHR_L 260. The LOFIC image transistor 244 is configured to sample and hold an LOFIC image signal into the LOFIC image capacitor 246 in response to an LOFIC image storage signal SHS_L 264. The storage signals SHR_H 252, SHS_H 256, SHR_L 260, and SHS_L 264 can be generated by a sample and hold driver circuitry (e.g., the switch driver 168 of the control circuit 110.

In various examples, the SH circuit 267 includes additional transistor and capacitor pairs for performing correlated multiple sampling (CMS), which can further reduce noise at the cost of a longer readout period. In various examples, the pixel circuit 204 is arranged on a pixel die 228, and the SH circuit 267 is arranged on an ASIC die 230.

Figure 3:
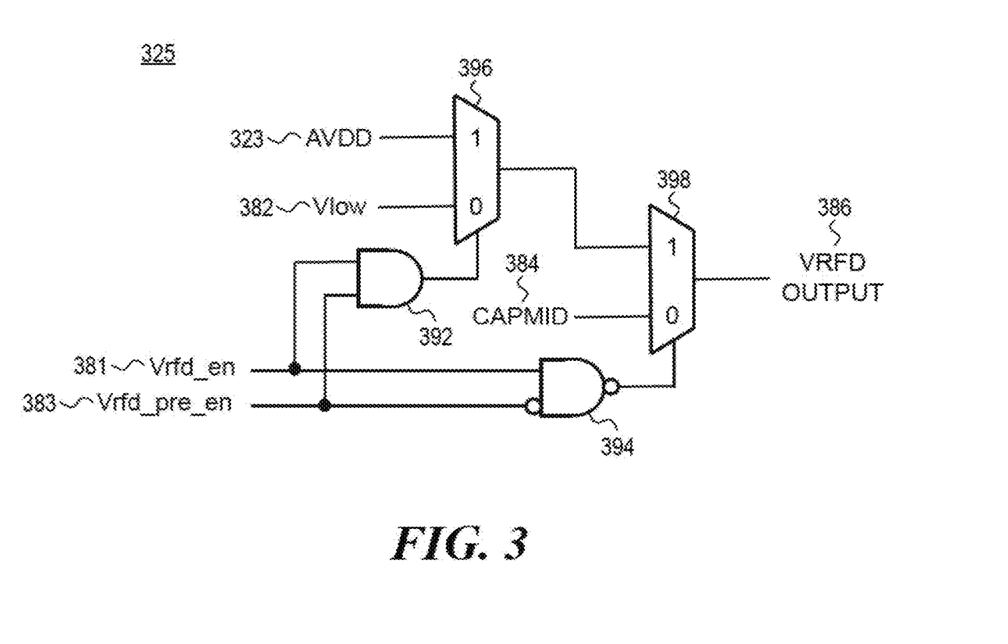
FIG. 3 illustrates a schematic of an example variable voltage source in accordance with the teachings of the present disclosure.

FIG. 3 illustrates a schematic of an example variable voltage source VRFD 325 in accordance with the teachings of the present disclosure. It is appreciated that the variable voltage source VRFD 325 of FIG. 3 may be an example of the variable voltage source VRFD 225 as shown in FIG. 2, and that similarly named and numbered elements described above are coupled and function similarly below.

In the illustrated example, the variable voltage source VRFD 325 includes an AND gate 392 coupled to receive a first enable signal Vrfd_en 381 and a second enable signal Vrfd_pre_en 383. A first multiplexer 396 is coupled to receive the high-voltage level AVDD 323 and a low-voltage level Vlow 382 (e.g., 1.4 V). The first multiplexer 396 is configured to output a first multiplexer output in response to an output of the AND gate 392. For example, if the output of the AND gate 392 is high (i.e., 1), the first multiplexer 396 is configured to output the high-voltage level AVDD 323, and if the output of the AND gate 392 is low (i.e., 0), the first multiplexer 396 is configured to output the low-voltage level Vlow 382. A NAND gate 394 is coupled to receive the first enable signal Vrfd_en 381 and a logical inverse of the second enable signal Vrfd_pre_en 383. A second multiplexer 398 is coupled to receive the first multiplexer output and a mid-voltage level CAPMID 384. The second multiplexer 398 is configured to output an output of the variable voltage source VRFD OUTPUT 386 in response to an output of the NAND gate 394. For example, if the output of the NAND gate 394 is high (i.e., 1), the second multiplexer 398 is configured to output the first multiplexer output (i.e., either AVDD 323 or Vlow 382), and if the output of the NAND gate 394 is low (i.e., 0), the second multiplexer 398 is configured to output the mid-voltage level CAPMID 384.

In various examples, the variable voltage source VRFD 325 has different components and/or configurations such that VRFD OUTPUT 386 can be one of the three different voltage levels Vlow 382, AVDD 323, or CAPMID 384. In various examples, the variable voltage source VRFD 325 can be configured to output fewer or more different voltage levels.

Figure 4:
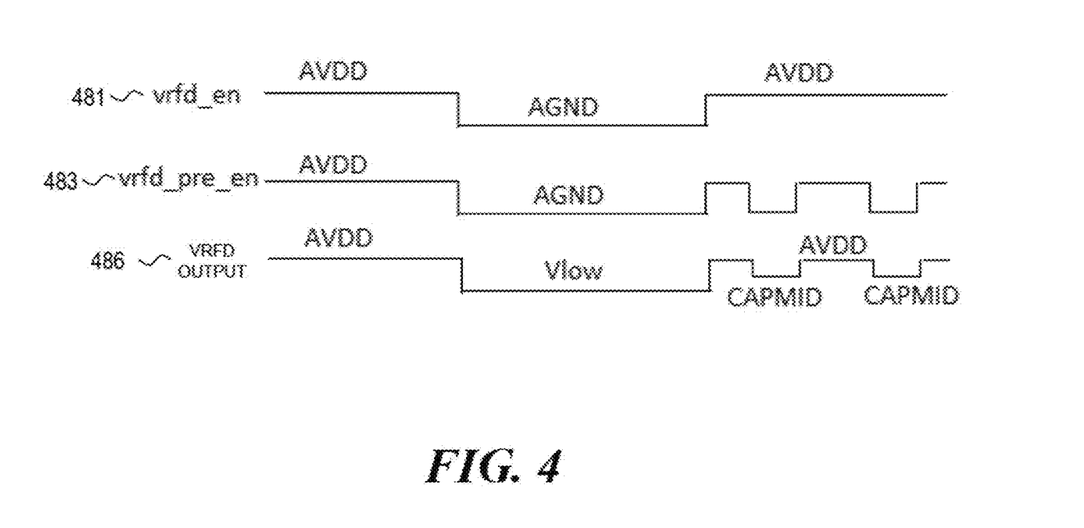
FIG. 4 illustrates a timing diagram of an example variable voltage source in accordance with the teachings of the present disclosure.

FIG. 4 illustrates a timing diagram of an example variable voltage source in accordance with the teachings of the present disclosure. It is appreciated that the timing diagram illustrated in FIG. 4 is an example timing diagram of the variable voltage source VRFD 325 as shown in FIG. 3, and that similarly named and numbered elements described above are coupled and function similarly below.

Each of a first enable signal Vrfd_en 481 and a second enable signal Vrfd_pre_en 483 can be toggled between a low value AGND and a high value AVDD. When both the first enable signal Vrfd_en 481 and the second enable signal Vrfd_pre_en 483 are configured to be at the high value AVDD, the output of the variable voltage source VRFD OUTPUT 486 can also be at the high-voltage level AVDD. When both the first enable signal Vrfd_en 481 and the second enable signal Vrfd_pre_en 483 are configured to be at the low value AGND, the output of the variable voltage source VRFD OUTPUT 486 can be at the low-voltage level Vlow.

When the first enable signal Vrfd_en 481 is configured to be at the high value AVDD and the second enable signal Vrfd_pre_en 483 is configured to be at the low value AGND, the output of the variable voltage source VRFD OUTPUT 486 can be at the mid-voltage level CAPMID. As shown in the depicted timing diagram, the second enable signal Vrfd_pre_en 483 can be toggled between the high and low voltage levels AVDD and AGND while the first enable signal Vrfd_en 481 is at the high voltage level AVDD such that the variable voltage source VRFD OUTPUT 486 switches between the high-voltage level AVDD and the mid-voltage level CAPMID.

Figure 5:
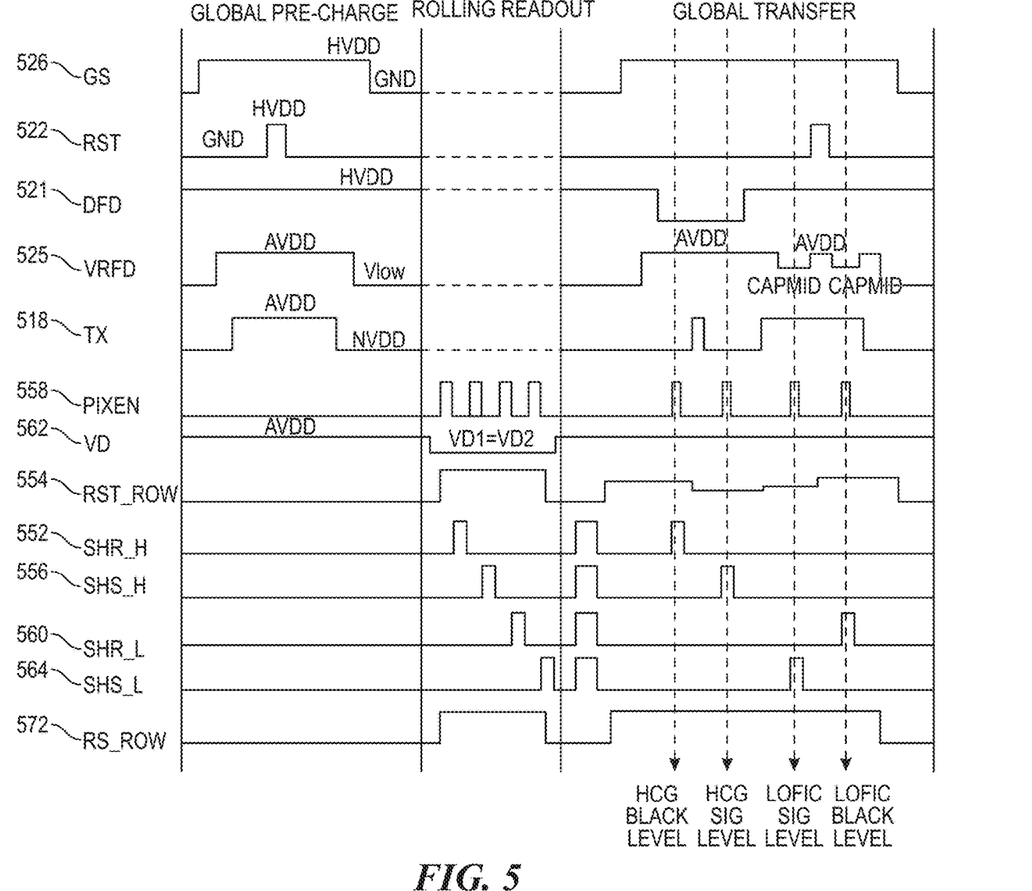
FIG. 5 illustrates a timing diagram of an example pixel circuit and an example sample and hold circuit in accordance with the teachings of the present disclosure.

FIG. 5 illustrates a timing diagram of an example pixel circuit and an example SH circuit in accordance with the teachings of the present disclosure. The illustrated timing diagram includes a global pre-charge period, a rolling readout period, and a global transfer period. It is appreciated that the timing diagram illustrated in FIG. 5 is an example timing diagram of the pixel circuit 204 and the SH circuit 267 as shown in FIG. 2, and that similarly named and numbered elements described above are coupled and function similarly below.

During the global pre-charge period, a sampling control signal GS 526, a variable voltage source VRFD 525, and a transfer control signal TX 518 are configured to switch from a low value (e.g., GND, Vlow, NVDD) to a high value (e.g., HVDD, AVDD), then switch back to the low value. A reset control signal RST 522 is configured to pulse during the global pre-charge period while the sampling control signal GS 526, the variable voltage source VRFD 525, and the transfer control signal TX 518 are at their respective high values. A dual floating diffusion control signal DFD 521 and a voltage buffer VD 562 are configured to remain at a high value (e.g., HVDD, AVDD) throughout the global pre-charge period. A row reset control signal RST_ROW 554 is configured to remain off. An SH enable control signal PIXEN 558 is also configured to remain off such that SH signal storage transistors and capacitors are electrically isolated from the pixel circuit. Consequently, an HCG reset storage signal SHR_H 552, an HCG image storage signal SHS_H 556, an LOFIC reset storage signal SHR_L 560, an LOFIC image storage signal SHS_L 564, and a row select control signal RS_ROW 572 are configured to remain off during the global pre-charge period.

During the rolling readout period, the SH enable control signal PIXEN 558 is configured to pulse once for each storage capacitor included in the SH circuit. In the illustrated example, four storage capacitors are included, so the SH enable control signal PIXEN 558 pulses four times and the HCG reset storage signal SHR_H 552, the HCG image storage signal SHS_H 556, the LOFIC reset storage signal SHR_L 560, and the LOFIC image storage signal SHS_L 564 pulse sequentially following each pulse of the SH enable control signal PIXEN 558. Both the row reset control signal RST_ROW 554 and the row select control signal RS_ROW 572 are configured to remain on while the SH enable control signal PIXEN 558 pulses. The voltage buffer VD 562 is configured to drop to a lower voltage level VD1 (equal to VD2) while the SH enable control signal PIXEN 558 pulses. As will be described in further detail below, being able to keep the voltage buffer VD 562 at a constant value during the rolling readout period is an advantage of an imaging system in accordance with the teachings of the present disclosure.

The global transfer period includes an HCG reset signal (i.e., BLACK level) readout, an HCG image signal (i.e., SIG level) readout, an LOFIC image signal (i.e., SIG level) readout, and an LOFIC reset signal (i.e., BLACK level) readout. Prior to these four aforementioned readouts, the HCG reset storage signal SHR_H 552, the HCG image storage signal SHS_H 556, the LOFIC reset storage signal SHR_L 560, and the LOFIC image storage signal SHS_L 564 are configured to pulse simultaneously. Additionally, the sampling control signal GS 526, the variable voltage source VRFD 525, the row reset control signal RST_ROW 554, and the row select control signal RS_ROW 572 are configured to switch to their respective high values (e.g., HVDD, AVDD). On the other hand, the dual floating diffusion control signal DFD 521 is configured to turn off.

During each of the four aforementioned readouts, the SH enable control signal PIXEN 558 is configured to pulse. During the HCG reset signal readout, the HCG reset storage signal SHR_H 552 is configured to pulse, transferring the black level signal stored in an HCG reset capacitor (e.g., the HCG reset capacitor 234). Afterwards, the transfer control signal TX 518 is configured to pulse.

During the HCG image signal readout, the HCG image storage signal SHS_H 556 is configured to pulse, transferring the image signal stored in an HCG image capacitor (e.g., the HCG image capacitor 238). Afterwards, the transfer control signal TX 518 and the dual floating diffusion control signal DFD 521 are configured to turn on, and the variable voltage source VRFD 525 is configured to output a mid-voltage level (e.g., CAPMID). In various, examples, the mid-voltage level is output via the configuration and timing illustrated in FIGS. 3 and 4.

During the LOFIC image signal readout, the LOFIC image storage signal SHS_L 564 is configured to pulse, transferring the image signal stored in an LOFIC image capacitor (e.g., the LOFIC image capacitor 246) while the variable voltage source VRFD 525 is at the mid-voltage level CAPMID. Afterwards, the reset control signal RST 522 is configured to pulse and the variable voltage source VRFD 525 is configured to pulse at the high-voltage level AVDD.

During the LOFIC reset signal readout, the LOFIC reset storage signal SHR_L 560 is configured to pulse, transferring the black level signal stored in an LOFIC reset capacitor (e.g., the LOFIC reset capacitor 242) while the variable voltage source VRFD 525 is at the mid-voltage level CAPMID. Afterwards, the variable voltage source VRFD 525 is configured to pulse at the high-voltage level AVDD again. All control signals and voltage levels illustrated, except for the dual floating diffusion control signal DFD 521 and the voltage buffer VD 562, are configured to drop to their respective low levels (e.g., GND, Vlow, NVDD).

In the illustrated timing diagram, the LOFIC image storage signal SHS_L 564 and the LOFIC reset storage signal SHR_L 560 are configured to pulse during the global transfer period while the variable voltage source VRFD 525 is at the mid-voltage level CAPMID such that the HCG black level signal and the LOFIC black level signal are balanced to be nearly identical values. This can be achieved because toggling the variable voltage source VRFD 525 from AVDD to CAPMID creates a voltage swing at a floating diffusion in the pixel circuit (e.g., the first floating diffusion 220). In various examples, a ratio between the mid-voltage level CAPMID and the high-voltage level AVDD is configured to adjust readouts during the HCG reset signal readout and the LOFIC reset signal readout to be substantially similar.

In addition, the variable voltage source VRFD 525 is configured to swing between the mid-voltage level CAPMID and the high-voltage level AVDD twice per frame during the global transfer period (i.e., during the LOFIC image signal readout and during the LOFIC reset signal readout) because VRFD 525 of each pixel circuit is globally connected to one another. Doing so can automatically adjust the LOFIC black level across all pixel circuits in the pixel array.

Furthermore, during the rolling readout period, in conventional imaging systems, the voltage buffer VD 562 is configured to be at a first voltage value VD1 while the HCG reset storage signal SHR_H 552 and the HCG image storage signal SHS_H 556 are pulsed, and at a second voltage value VD2 that is different from VD1 while the LOFIC reset storage signal SHR_L 560 and the LOFIC image storage signal SHS_L 564 are pulsed. However, in an imaging system configured in accordance with the teachings of the present disclosure, the voltage buffer VD 562 can be configured to remain at a constant value VD1=VD2 that is close to the demanded black level at a third floating diffusion (e.g., the third floating diffusion 265), removing the complexity of having to toggle the voltage buffer VD 562 multiple times per frame and/or across different rows.

An imaging system configured in accordance with the teachings of the present disclosure also provides reduced fixed pattern noise (FPN) and improved linearity by tuning the linear operating region and overall performance of a second source follower transistor (e.g., the second source follower transistor 270) based on the same black level to target demanded dynamic range regions and amplify two nearly identical signal voltage regions.

The above description of illustrated examples of the disclosure, including what is described in the Abstract, is not intended to be exhaustive or to limit the disclosure to the precise forms disclosed. While specific examples of the disclosure are described herein for illustrative purposes, various modifications are possible within the scope of the disclosure, as those skilled in the relevant art will recognize.

These modifications can be made to the disclosure in light of the above detailed description. The terms used in the following claims should not be construed to limit the disclosure to the specific examples disclosed in the specification. Rather, the scope of the disclosure is to be determined entirely by the following claims, which are to be construed in accordance with established doctrines of claim interpretation.

What is claimed is:

1. A pixel circuit, comprising:
   a photodiode configured to photogenerate image charge in response to incident light;
   a floating diffusion coupled to receive the image charge from the photodiode;
   a transfer transistor coupled between the photodiode and the floating diffusion to transfer the image charge from the photodiode to the floating diffusion;
   a reset transistor coupled between a variable voltage source and the floating diffusion, wherein the reset transistor is configured to be switched in response to a reset control signal; and
   a lateral overflow integration capacitor (LOFIC) coupled between the variable voltage source and the floating diffusion,
   wherein the variable voltage source is configured to output a high-voltage level during a high conversion gain (HCG) reset signal readout and an HCG image signal readout,
   wherein the variable voltage source is configured to output a mid-voltage level during a LOFIC image signal readout and a LOFIC reset signal readout, and
   wherein the variable voltage source is configured to output a low-voltage level during a rolling readout period.

2. The pixel circuit of claim 1, wherein the variable voltage source is configured to pulse at the high-voltage level after the LOFIC image signal readout and after the LOFIC reset signal readout.

3. The pixel circuit of claim 1, wherein the variable voltage source comprises:
   an AND gate coupled to receive a first enable signal and a second enable signal;
   a first multiplexer coupled to receive the high-voltage level and a low-voltage level, wherein the first multiplexer is configured to output a first multiplexer output in response to an output of the AND gate;
   a NAND gate coupled to receive the first enable signal and a logical inverse of the second enable signal; and
   a second multiplexer coupled to receive the first multiplexer output and the mid-voltage level, wherein the second multiplexer is configured to output an output of the variable voltage source in response to an output of the NAND gate.

4. The pixel circuit of claim 3, wherein the output of the variable voltage source is configured to be the high-voltage level when the first and second enable signals are high, wherein the output of the variable voltage source is configured to be the low-voltage level when the first and second enable signals are low, and wherein the output of the variable voltage source is configured to be the mid-voltage level when the first enable signal is high and the second enable signal is low.

5. The pixel circuit of claim 1, further comprising:
   a dual floating diffusion transistor coupled between the floating diffusion and the reset transistor;
   a source follower transistor having a gate terminal coupled to the floating diffusion and a drain terminal coupled to receive the high-voltage level; and
   a sampling transistor coupled between the source follower transistor and a sample and hold (SH) circuit.

6. The pixel circuit of claim 1, wherein a ratio between the mid-voltage level and the high-voltage level is configured to adjust readouts during the HCG reset signal readout and the LOFIC reset signal readout to be similar.

7. An imaging system, comprising:
   a pixel array including a plurality of pixel cells arranged in rows and columns, wherein each of the pixel cells is coupled to generate image charge in response to incident light, and wherein each of the pixel cells comprises:

a photodiode configured to photo generate image charge in response to incident light;

a floating diffusion coupled to receive the image charge from the photodiode;

a transfer transistor coupled between the photodiode and the floating diffusion to transfer the image charge from the photodiode to the floating diffusion;

a reset transistor coupled between a variable voltage source and the floating diffusion, wherein the reset transistor is configured to be switched in response to a reset control signal; and a lateral overflow integration capacitor (LOFIC) coupled between the variable voltage source and the floating diffusion; and a readout circuit coupled to the pixel array to readout the image charge from the pixel array, wherein the readout circuit comprises:

a sample and hold (SH) circuit coupled between one of the pixel cells and one of a plurality of bitlines, wherein the SH circuit comprises a row reset transistor coupled between a voltage buffer and the one of the pixel cells, wherein the voltage buffer is configured to output a constant voltage level during a rolling readout period; and an analog to digital converter (ADC) coupled to the plurality of bitlines, wherein the variable voltage source is configured to output a high-voltage level during a high conversion gain (HCG) reset signal readout and an HCG image signal readout, wherein the constant voltage level is less than the high-voltage level; and wherein the variable voltage source is configured to output a mid-voltage level during a LOFIC image signal readout and a LOFIC reset signal readout.

8. The imaging system of claim 7, wherein the SH circuit further comprises:

an HCG reset capacitor coupled between the row reset transistor and an SH voltage source;

an HCG reset transistor coupled between the row reset transistor and the HCG reset capacitor;

an HCG image capacitor coupled between the row reset transistor and the SH voltage source;

an HCG image transistor coupled between the row reset transistor and the HCG image capacitor;

an LOFIC reset capacitor coupled between the row reset transistor and the SH voltage source;

an LOFIC reset transistor coupled between the row reset transistor and the LOFIC reset capacitor;

an LOFIC image capacitor coupled between the row reset transistor and the SH voltage source; and an LOFIC image transistor coupled between the row reset transistor and the LOFIC image capacitor.

9. The imaging system of claim 8, wherein signals coupled to gate terminals of the HCG reset transistor, the HCG image transistor, the LOFIC reset transistor, and the LOFIC image transistor are configured to be pulsed sequentially during a rolling readout period.

10. The imaging system of claim 7, wherein the variable voltage source is configured to pulse at the high-voltage level after the LOFIC image signal readout and after the LOFIC reset signal readout.

11. The imaging system of claim 7, wherein the variable voltage source comprises:

an AND gate coupled to receive a first enable signal and a second enable signal;

a first multiplexer coupled to receive the high-voltage level and a low-voltage level, wherein the first multiplexer is configured to output a first multiplexer output in response to an output of the AND gate;

a NAND gate coupled to receive the first enable signal and a logical inverse of the second enable signal; and a second multiplexer coupled to receive the first multiplexer output and the mid-voltage level, wherein the second multiplexer is configured to output an output of the variable voltage source in response to an output of the NAND gate.

12. The imaging system of claim 11, wherein the output of the variable voltage source is configured to be the high-voltage level when the first and second enable signals are high, wherein the output of the variable voltage source is configured to be the low-voltage level when the first and second enable signals are low, and wherein the output of the variable voltage source is configured to be the mid-voltage level when the first enable signal is high and the second enable signal is low.

13. The imaging system of claim 7, each of the pixel cells further comprises:

a dual floating diffusion transistor coupled between the floating diffusion and the reset transistor;

a source follower transistor having a gate terminal coupled to the floating diffusion and a drain terminal coupled to receive the high-voltage level; and a sampling transistor coupled between the source follower transistor and the SH circuit.

14. A method of operating an imaging system, comprising:

coupling a pixel circuit of a pixel array to a sample and hold (SH) circuit of a readout circuit, wherein the pixel circuit comprises a photodiode configured to photo generate image charge in response to incident light, a floating diffusion coupled to receive the image charge from the photodiode, a transfer transistor coupled between the photodiode and the floating diffusion to transfer the image charge from the photodiode to the floating diffusion, a reset transistor coupled between a variable voltage source and the floating diffusion, wherein the reset transistor is configured to be switched in response to a reset control signal, and a lateral overflow integration capacitor (LOFIC) coupled between the variable voltage source and the floating diffusion, and wherein the SH circuit comprises a row reset transistor coupled between a voltage buffer and the pixel circuit;

configuring the variable voltage source to output a high-voltage level during a high conversion gain (HCG) reset signal readout and an HCG image signal readout; and configuring the variable voltage source to output a mid-voltage level during a LOFIC image signal readout and a LOFIC reset signal readout; and configuring the voltage buffer to output a constant voltage level during a rolling readout period, wherein the constant voltage level is less than the high-voltage level.

15. The method of claim 14, further comprising:

configuring the variable voltage source to pulse at the high-voltage level after the LOFIC image signal readout and after the LOFIC reset signal readout.

16. The method of claim 14, wherein the variable voltage source comprises:

an AND gate coupled to receive a first enable signal and a second enable signal;

a first multiplexer coupled to receive the high-voltage level and a low-voltage level, wherein the first multiplexer is configured to output a first multiplexer output in response to an output of the AND gate;
a NAND gate coupled to receive the first enable signal and a logical inverse of the second enable signal; and
a second multiplexer coupled to receive the first multiplexer output and the mid-voltage level, wherein the second multiplexer is configured to output an output of the variable voltage source in response to an output of the NAND gate.

17. The method of claim 14, further comprising:
configuring a ratio between the mid-voltage level and the high-voltage level to adjust readouts during the HCG reset signal readout and the LOFIC reset signal readout to be similar.

* * * * *